Patented May 27, 1941

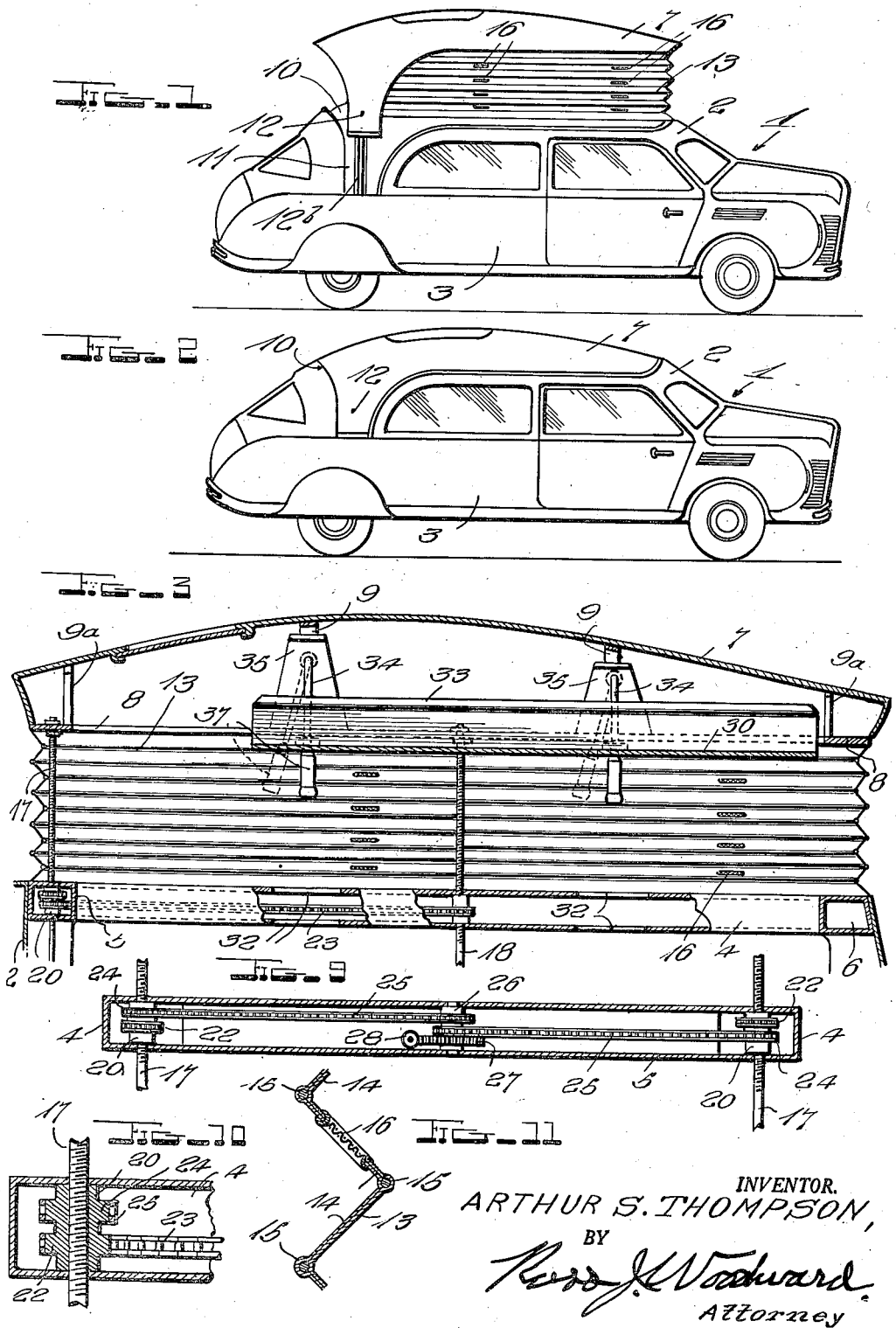

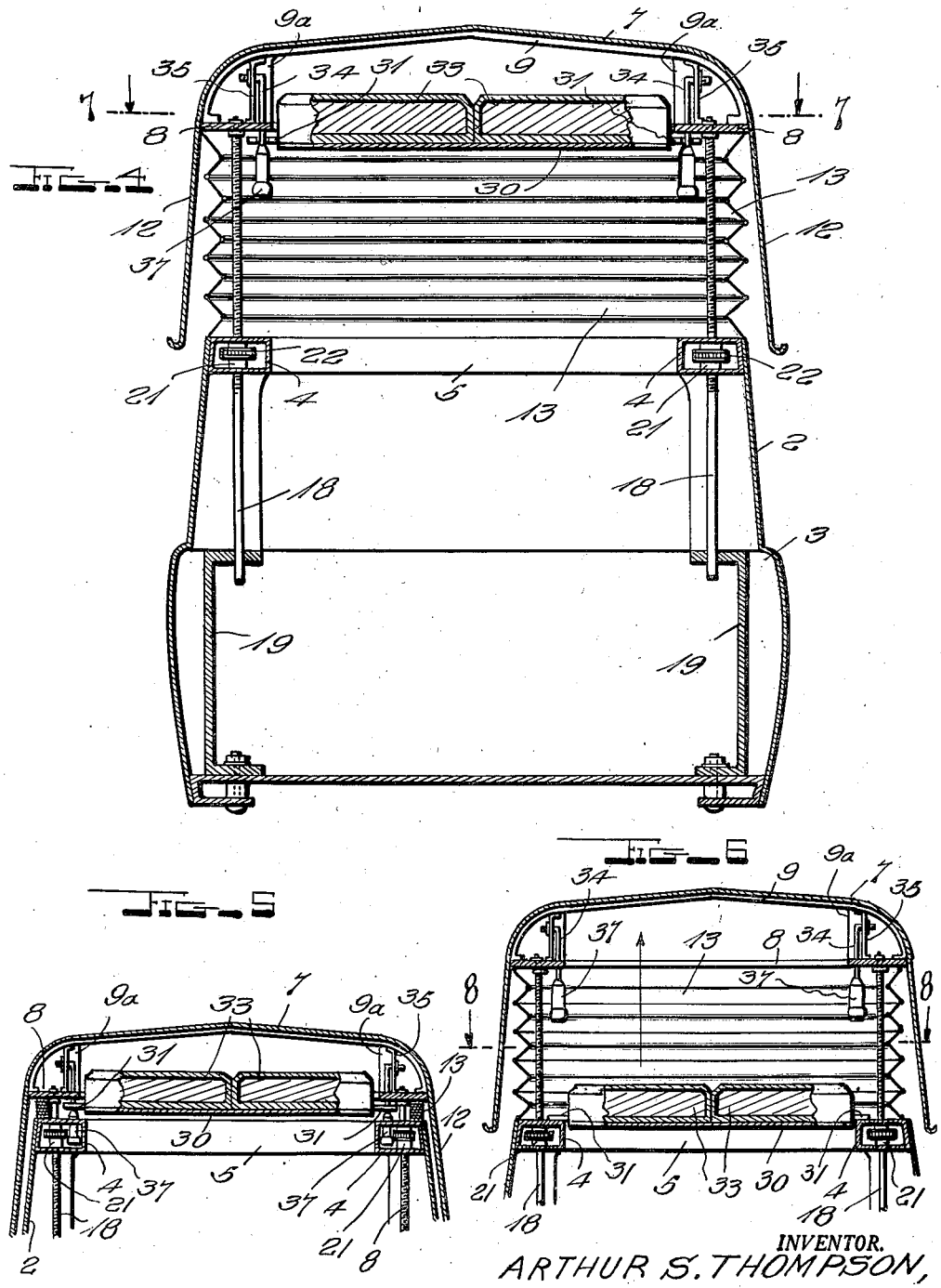

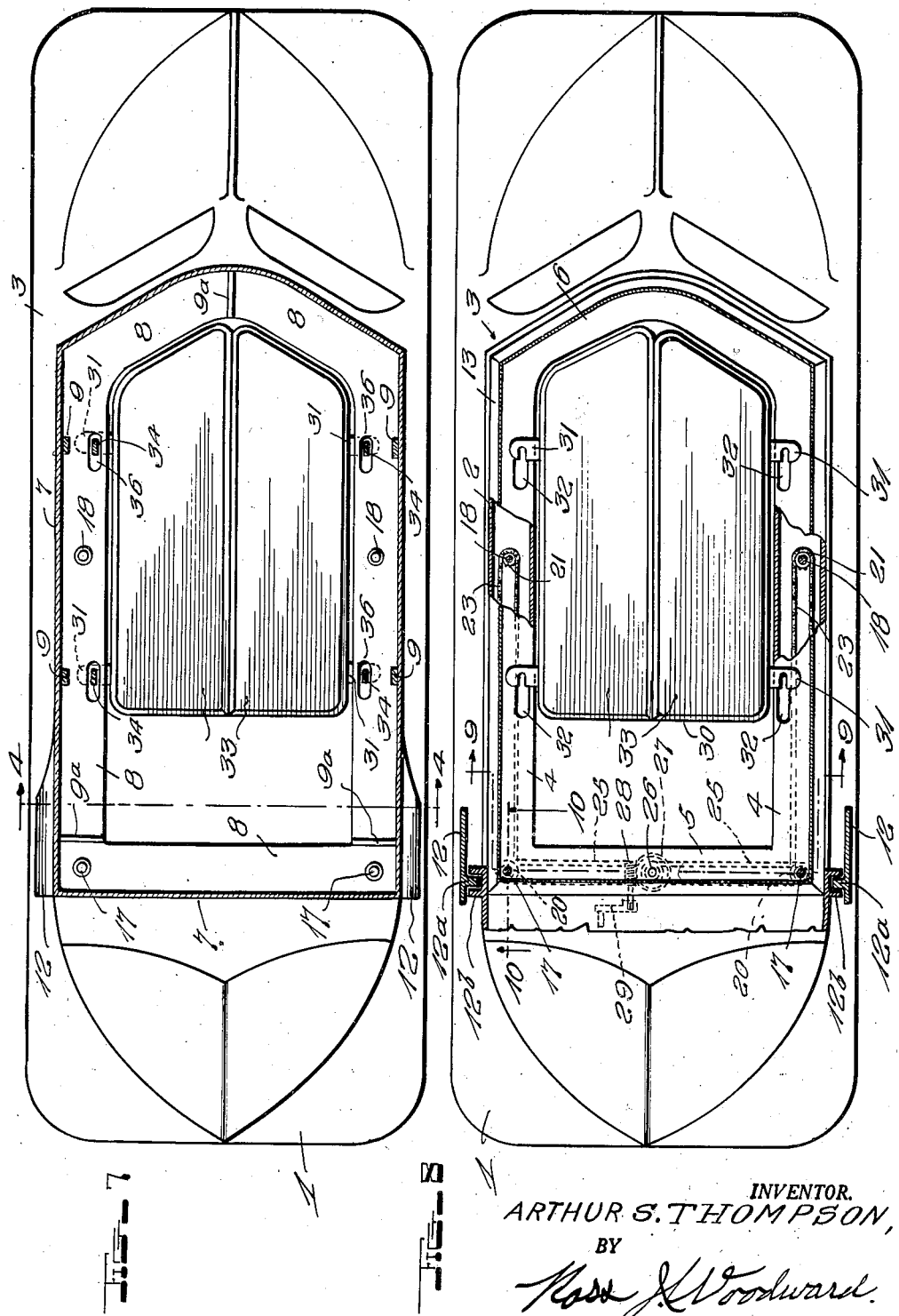

2,243,659

UNITED STATES PATENT OFFICE 2,243,659

SEDAN TOP AND SLEEPING COMPARTMENT

Arthur S. Thompson, Ontario, Calif.

Application August 27, 1940, Serial No. 354,457

7 Claims. (Cl. 296—23)

This invention relates to vehicles and more particularly to an automobile of the sedan type provided with an improved top and a sleeping compartment.

One object of the invention is to provide a closed automobile with a top so constructed that it may be shifted from a lowered position to a raised position, thereby providing additional head room in the automobile when the automobile is used as living quarters by a party traveling from one location to another and living in the automobile when stops are made during the trip.

Another object of the invention is to so form the top that while it may be shifted from lowered position to raised position, this will not be apparent when the top is lowered and the appearance of the automobile will not be detracted from when the top is in its normal lowered position.

Another object of the invention is to provide the top with walls of such formation that when the top is raised the walls will be extended upwardly to provide shields or closures for space between the raised top and the body of the automobile.

Another object of the invention is to provide adjustable supporting means for the shiftable top which may be easily actuated to raise or lower the top and serve to firmly support the top when it is raised.

Another object of the invention is to so form the top that a support for mattresses constituting a bed may be carried by the top within the automobile and shifted vertically with the top when it is merely desired to shift the top upwardly to provide greater head room in the automobile.

Another object of the invention is to provide improved means for detachably connecting the bed with the top and thus allowing the top to be raised while the bed remains stationary for use as a bed.

In the accompanying drawings:

Fig. 1 is a side elevation showing the top in raised position.

Fig. 2 is a similar view showing the top lowered to its normal position.

Fig. 3 is a sectional view taken longitudinally through the top when in raised position.

Fig. 4 is a sectional view taken transversely through the automobile with the top raised, the view being taken on the line 4—4 of Fig. 7.

Fig. 5 is a transverse sectional view showing the top in lowered position.

Fig. 6 is a transverse sectional view showing the top raised and the bed in position for use.

Fig. 7 is a view looking down on the improved automobile with the top in section, on the line 7—7 of Fig. 4.

Fig. 8 is a view similar to Fig. 7, showing the top in section, on the line 8—8 of Fig. 6.

Fig. 9 is a fragmentary sectional view taken horizontally through the rear portion of the top, on the line 9—9 of Fig. 8.

Fig. 10 is a fragmentary sectional view on the line 10—10 of Fig. 8.

Fig. 11 is a sectional view on an enlarged scale, taken vertically through a portion of the extensible wall of the top.

This improved automobile, which is indicated in general by the numeral 1, has the upper portion 2 of its body 3 open at its top, the open top of the body being bordered by inwardly extending ledges or shoulders 4, 5 and 6 along its sides and at its front and rear. The top or cover 7 for closing or shielding the open top of the body has depending wall portions carrying an open frame 8 which is suitably secured along its margins and has secured to it the ends of a number of yokes 9 constituting braces for the cover. Bracing webs 9a have also been provided. The outer face of the upper portion 2 of the body 3 is recessed to form a seat 10 to receive portions of the cover 7 which project from the open frame 8 and at opposite sides of the body the seat is formed with downwardly extending portions 11 to receive side wings or arms 12 which extend downwardly from the cover at opposite sides thereof and impart an attractive appearance to the automobile, as well as establishing a good fit between the body and the cover when the cover is in its normal lowered position. Ribs 12a, which are engaged in tracks 12b, brace the wings against longitudinal displacement.

The walls 13 which are provided between the cover 7 and the top of the vehicle body, are of bellows formation and have their upper portions firmly secured to the open frame 8 and their lower portions secured upon the body in enclosing relation to the opening in the body and the hollow ledges or shoulders bordering the same. The sections 14 of the extensible and collapsible walls are pivotally connected with each other, as shown at 15 in Fig. 11, and are provided with a suitable number of ventilators 16 so that air may circulate through the raised top.

The top is to be raised to provide sufficient head room to permit persons to stand erect in the automobile, as shown in Figs. 3, 4 and 5, or provide the automobile with an upper sleeping compartment within the raised top, as shown in Fig. 6. In order to raise and lower the top and support the same in vertically adjusted position, there have been provided a number of threaded shafts or standards 17 and 18. These standards or shafts extend vertically and are rotatably mounted through the hollow ledges 4 and 5 with their upper ends rotatably connected with the frame 8 and their lower ends slidably passing through guides 19. Internally threaded sleeves 20 and 21 are carried by the shafts within the hollow ledges and are formed with sprockets 22 about which are trained sprocket chains 23 for transmitting rotary motion from the sleeves 20 to sleeves 21. This causes the sleeves to be simultaneously rotated at the same speed and the shafts will be shifted vertically and evenly lift or lower the front and rear portions of the top. The sleeves 20 are provided with a second set of sprockets 24 for engagement by sprocket chains 25 which are trained about a double sprocket 26. This double sprocket 26 is rotatably mounted midway the length of the rear ledge 5 and carries a worm gear 27 meshing with a worm 28. The shaft or worm protrudes rearwardly from the ledge 5 and, at its rear end, carries a crank 29 by means of which it is turned to impart rotary motion to the double sprocket. Referring to Figs. 8 and 9, it will be seen that when the double sprocket is turned, rotary motion will be transmitted to both sleeves 20 and the top will be shifted vertically evenly at both sides thereof. By this arrangement, the top may be very easily shifted vertically from lowered position to raised position and supported in raised position for supplying additional head room in the automobile or defining a sleeping compartment having walls provided by the extensible walls 13 of the top.

The opening on the upper portion of the automobile body which is bordered by the hollow ledges or shoulders 4, 5 and 6, is normally closed for the major portion of its length by a plate or panel 30 having hook-shaped ears 31 extending from its opposite side edges for resting on the ledges 4 at ends of slots 32 formed in the ledges. The mattresses 33 rest on the panel 30 and are of such width that they may extend into the cover 7. Hangers 34, which are pivotally carried by brackets 35, extend downwardly through openings 36 formed in side portions of the frame 8, and have handles or heads 37 at their lower ends so that when the hangers are in engagement with the ears or hooks 31, the panel will be suspended from the hangers and carried upwardly with the same when the cover is raised. By this arrangement, the panel will serve as a ceiling for the automobile body when the cover is in either the lowered position shown in Figure 5 or the raised position shown in Figure 4. By swinging the hangers out of engagement with the hooks 31, the cover 7 may be raised and the panel left at rest on the side ledges 4, as shown in Fig. 6. The raised cover and its extensible walls 13 will then define a sleeping compartment into which entrance is obtained through space between the rear end of the panel and the rear ledge 5. This is clearly shown in Fig. 3, it being understood that in such use, the panel will be resting on the side ledges 4 instead of being suspended by the hangers.

From the foregoing description, it will be seen that an automobile of the improved construction will be very convenient for use when camping or by persons making long trips requiring overnight stops. It will also be apparent that when the cover is lowered, as shown in Fig. 2, the automobile will have the appearance of a car of conventional design and that the extensible top will not detract from the appearance of the car.

Having thus described the invention, what is claimed is:

1. In a vehicle construction, a body open at its top, a cover for said body having vertically extensible walls secured at their lower ends to the body about the open top thereof, means for shifting the cover vertically and supporting the cover in raised position, a panel for partially closing the opening at the top of the body, means for detachably connecting the panel with the cover whereby the panel may be selectively moved upwardly with cover or remain resting upon walls of the body when the cover is raised, and a mattress carried by the panel.

2. In a vehicle construction, a body open at its top, a cover for said body having depending vertically extensible walls secured along their lower edges to the body about the open top thereof, means for shifting the cover vertically and supporting the cover in raised position, a pallet for resting upon upper edges of walls of the body in partial closing relation to the open top of the body and cooperating with the cover and its walls to form a sleeping chamber when the cover is raised, and means for releasably connecting the pallet with the cover whereby the pallet may be carried upwardly with and suspended from the cover in an elevated position when the cover is raised.

3. In a vehicle construction, a body open at its top and having side windows, a cover for said body having vertically extensible walls secured along their lower edges to the body about the open top thereof, means for shifting the cover vertically and supporting the cover in raised position with the walls extended upwardly, and side wings for the cover extending downwardly at opposite sides thereof in offset relation to windows of the body and slidably engaged with the body at opposite sides thereof for bracing the cover against movement longitudinally of the body when the cover is raised.

4. In a vehicle construction, a body open at its top, a cover for said body having vertically extensible walls secured along their lower edges to the body about the open top thereof, means for shifting the cover vertically and supporting the cover in raised position, a pallet resting upon walls of the body for forming a ceiling for the body and for cooperating with the cover and its walls to form a sleeping chamber when the cover is raised, and hangers pivoted at their upper ends to the cover and movable into and out of position for engaging of their lower ends with the pallet to carry the pallet upwardly with the cover and support said pallet in elevated position when the cover is raised.

5. In a vehicle construction, a body open at its top, a cover for said body having vertically extensible walls secured along their lower ends to walls of the body about the open top thereof, means for shifting the cover vertically and supporting the cover in raised position, a pallet, hooks extending from opposite sides of the pallet for resting upon walls of the body at opposite sides of the open top thereof and supporting the pallet in partial closing relation to the open top of the body to cooperate with the top and the walls thereof to provide a sleeping chamber when the cover is raised, and hangers carried by the cover and movable into and out of position to engage the hooks and carry the pallet upwardly with the cover to an elevated position when the cover is raised.

6. In a vehicle construction, a body open at its top and having inwardly extending ledges along upper edges of its walls, a cover for said body having vertically extensible walls secured at their lower ends to the body about the open top thereof, ledges carried by the cover and extending inwardly along the junction of the cover with the extensible walls for disposition over the ledges of the body when the cover is in a lowered position, means for shifting the cover vertically and supporting the cover in raised position, a pallet, hooks extending from opposite sides of the pallet for resting upon ledges at opposite sides of the open body and supporting the pallet in partial closing relation to the open top of the body to cooperate with the top and its walls to provide a sleeping chamber when the cover is raised, brackets carried by the ledges of the cover and extending upwardly therefrom at opposite sides of the cover, and vertical hangers pivoted at their upper ends to said brackets and provided with heads at their lower ends for detachable engagement with the hooks to carry the pallet upwardly with the cover and support the pallet in an elevated position when the cover is raised.

7. In a vehicle construction, a body having an open top, inwardly extending ledges carried by the body about the open top thereof, a cover for said body having vertically extensible walls secured to the body about the open top thereof, means for shifting the cover vertically and supporting the cover in raised position, an inwardly extending frame carried by said cover about margins thereof, a pallet for partially closing the open top of the body and cooperating with the cover and its walls to form a sleeping chamber when the cover is raised, hooks extending from opposite sides of the pallet for resting upon the ledges at opposite sides of the body and supporting the pallet free from the cover in closing relation to the open top of the body, brackets carried by the frame and extending upwardly therefrom at opposite sides of the cover, and hangers pivotally carried by said brackets and extending downwardly therefrom through the frame and having heads at their lower ends movable with the hangers into and out of position to engage the hooks and suspend the pallet in an elevated position when the cover is raised, the heads at the lower ends of the hangers being elongated and constituting handles extending downwardly through the openings in the hollow ledges when the cover is in its lowered position.

ARTHUR S. THOMPSON.